United States Patent [19]

Andres et al.

[11] 3,903,984
[45] Sept. 9, 1975

[54] PNEUMATICALLY OPERATED CONTROL DEVICE FOR AUTOMATIC ALIGNMENT OF MOTOR VEHICLE LIGHTS

[75] Inventors: Rudolf Andres, Sindelfingen; Hermann Möller, Aidlingen, both of Germany

[73] Assignee: Daimler-Benz Aktiengesellschaft, Germany

[22] Filed: June 7, 1973

[21] Appl. No.: 367,942

[30] Foreign Application Priority Data
June 7, 1972  Germany............................ 2227663

[52] U.S. Cl............................ 180/82 R; 240/7.1 LJ
[51] Int. Cl.[2]........................................... B60Q 1/10
[58] Field of Search ..... 180/82 R; 240/7.1 LJ, 61.1, 240/61.2, 63.3; 92/48, 100, 101; 91/47

[56] References Cited
UNITED STATES PATENTS

| | | | |
|---|---|---|---|
| 1,992,343 | 2/1935 | Ahnstrom | 92/48 X |
| 2,974,640 | 3/1961 | Lindblom | 92/100 X |
| 3,325,636 | 6/1967 | Roberts | 240/61.1 X |
| 3,336,470 | 8/1967 | Sombardier | 240/7.1 LJ |
| 3,551,668 | 12/1970 | Rivolier | 240/7.1 LJ |
| 3,596,837 | 8/1971 | Todd | 240/61.2 X |
| 3,707,623 | 12/1972 | Rivolier | 240/7.1 LJ |

*Primary Examiner*—David Schonberg
*Assistant Examiner*—Terrance L. Siemens
*Attorney, Agent, or Firm*—Craig & Antonelli

[57] ABSTRACT

A pneumatically operated control installation for the automatic alignment of motor vehicle headlights which consists of pressure modulators coordinated to the two axles of the motor vehicle which align the motor vehicle headlights to a constant light distance as a function of the change of the distance of the respective axle with respect to the body of the motor vehicle; a control element, a control shifting device and a working element are interconnected between the pressure modulators and the headlights which are arranged, one behind the other in a structural unit consisting of a single housing that is closed off on both sides by means of covers.

12 Claims, 4 Drawing Figures

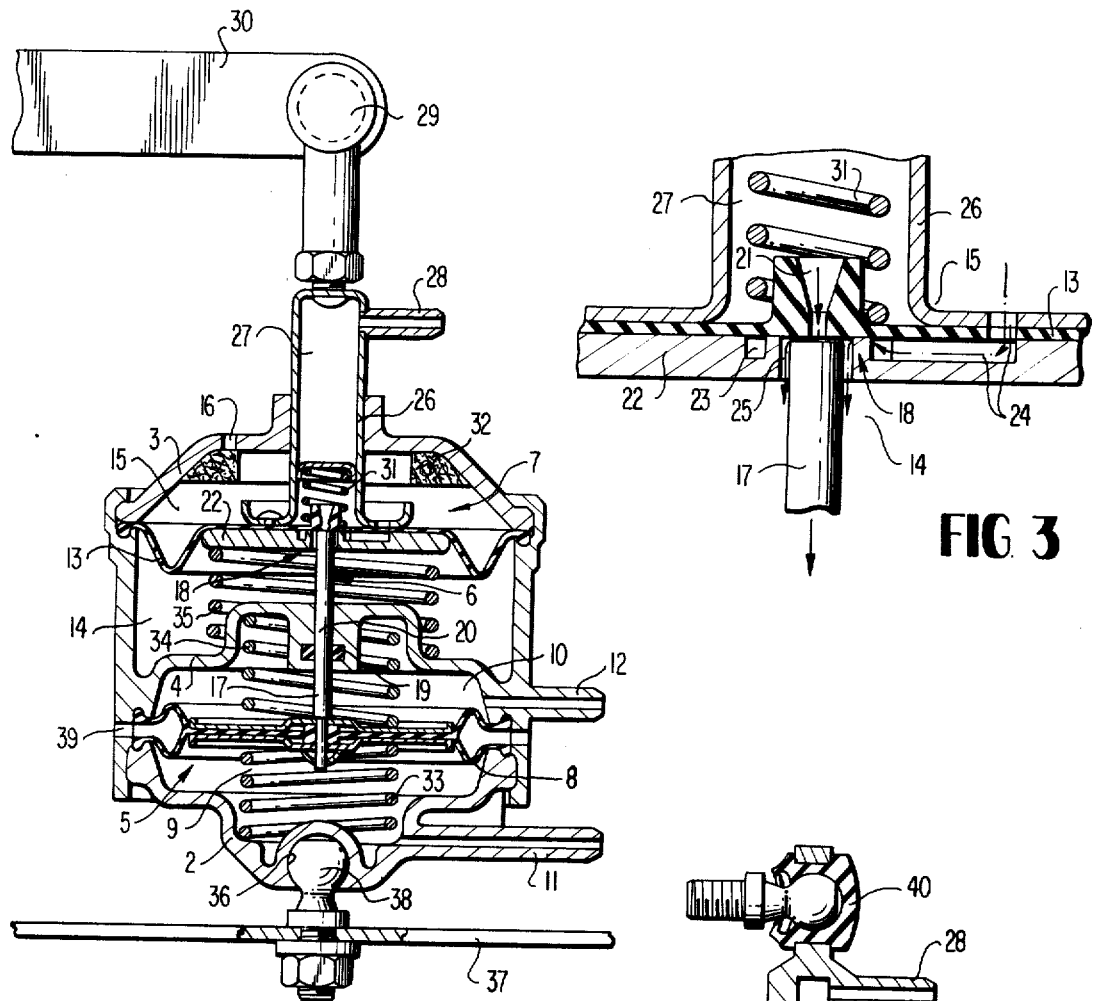
FIG. 3
FIG. 1
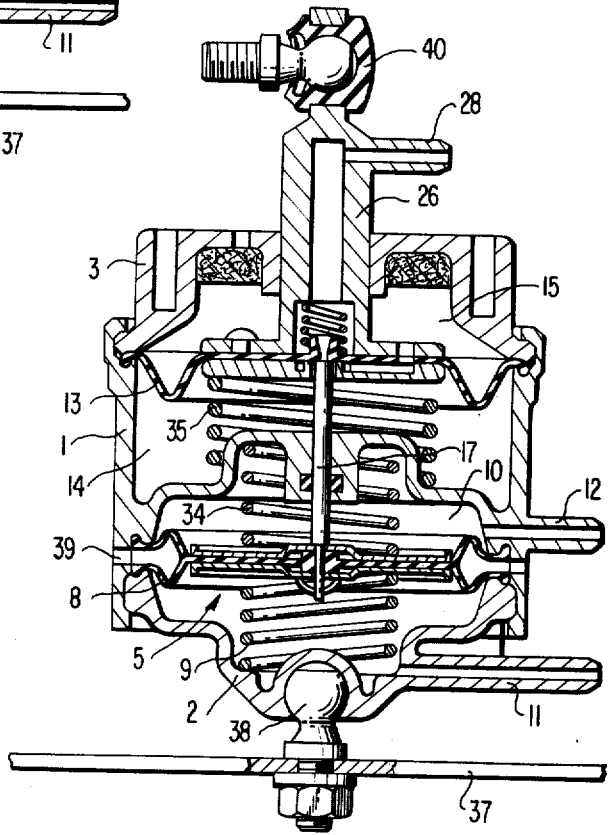
FIG. 2

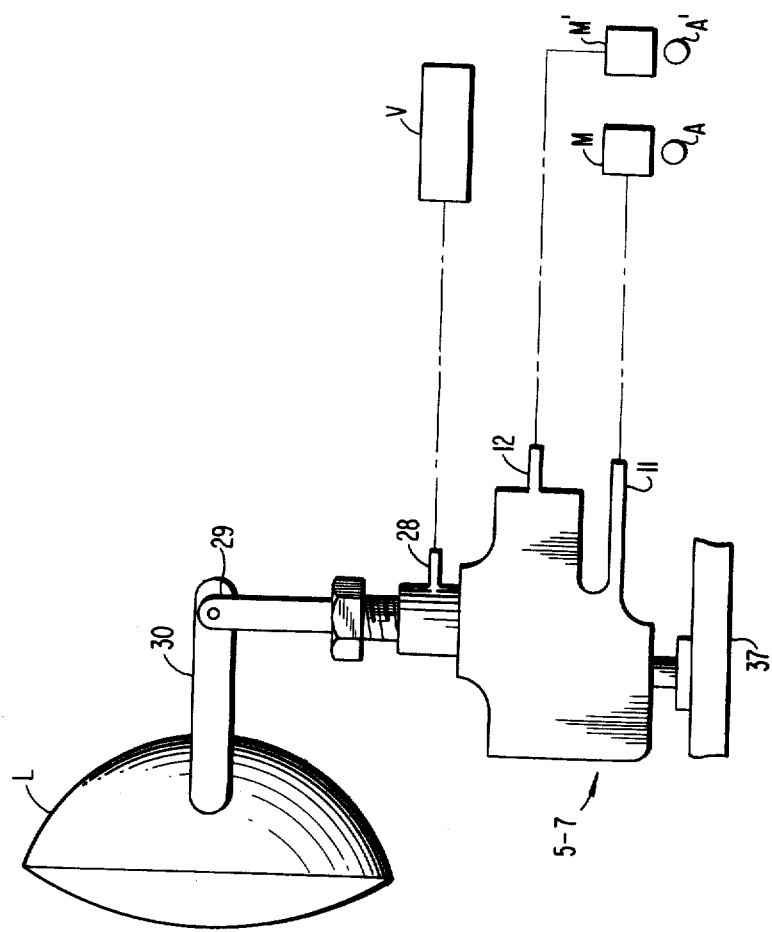

PNEUMATICALLY OPERATED CONTROL DEVICE FOR AUTOMATIC ALIGNMENT OF MOTOR VEHICLE LIGHTS

The present invention relates to a pneumatically operating control system for the automatic alignment of motor vehicle headlights, consisting of pressure modulators coordinated to the two axles of the motor vehicle which align the motor vehicle headlights to a constant light distance in dependence on the change of the distance of the respective axle relative to the body of the motor vehicle by way of a control element, a control shifting device and an operating or working element, with the control system fed with vacuum, as disclosed in U.S. Pat. No. 3,784,810, the subject matter of which is incorporated herein by reference to the extent necessary.

The aforementioned U.S. Patent relates to a pneumatically operating control installation for automatically aligning motor vehicle headlights in which control members, coordinated to one or two of the axles of the motor vehicle which align the headlights to a constant light range as a function of changes of the distance of the respective axle to the superstructure of the motor vehicle by way of adjusting motors and a control device, are constructed as pressure modulators while a vacuum, available at all times, is fed to the control installation.

The present invention is concerned with the task to so constructively design and realize the control system of the aforementioned United States Patent that it occupies little space and can be favorably accommodated, and furthermore to so contruct the same that a long length of life without failures and troubles is achieved. The underlying problems are solved according to the present invention in that the control element, the control shifting device and the working element which are arranged in series one behind the other, are combined in a structural unit consisting of a single housing covered off on both sides by means of covers.

The construction of the control mechanism according to the present invention brings about a very compact construction. Few individual parts and a minimum of seals are required. The control mechanism may also be arranged in the motor vehicle under spatially limited conditions and is not prone to troubles.

In an advantageous embodiment of the subject matter of the present invention, the housing can be subdivided by a partition wall into two spaces, of which one space is subdivided into two chambers each individually connected with a respective pressure modulator while the other space, for purposes of forming the working element, is subdivided into two chambers by a diaphragm carrying out the alignment of the headlights by way of a piston rod, of which one of the chambers is connected with the atmosphere and the other is adapted to be selectively connected by the control shifting device with a vacuum source or with the atmosphere.

The control shifting device may consist in a simple manner of a shifting pin connected with the diaphragm of the control element and extending through the partition wall in the housing and of a valve controlled by the shifting pin and constituted by the diaphragm of the working element.

The valve may include structurally and functionally advantageously two valve seats to be alternately opened or closed in dependence on the position of the shifting pin, of which one valve seat in the opened position of the valve connects the chamber connected with the atmosphere, with the other chamber and of which the other valve seat connects this chamber with a hollow space in the piston rod which is in communication with the vacuum source.

In order to achieve in the control element a high response sensitivity of the diaphragm and to avoid the inverting action which impairs the length of life, the diaphragm separating from one another the chambers of the control element may be constructed double-walled between the clamped places thereof radially inwardly and radially outwardly and the space between the walls may be connected with the atmosphere.

The cover closing the control element may be constructed in a structurally favorable manner in its central area as ball socket. Also the piston rod may be provided with a ball socket.

The housing, its two covers, and the piston rod together with the ball socket may consist in a simple manner of synthetic plastic material of any conventional type, for example, of known synthetic resinous material.

Accordingly, it is an object of the present invention to provide a pneumatically operating control mechanism for the automatic alignment of motor vehicle headlights which avoids by simple means the aforementioned shortcomings and drawbacks encountered in the prior art.

Another object of the present invention resides in a pneumatically operating control installation for the automatic alignment of headlights which requires little space and can be favorably accommodated within the vehicle.

A further object of the present invention resides in a pneumatically operating control system of the type described above which exhibits a long length of life and is substantially trouble-free.

Still a further object of the present invention resides in a control system for the automatic headlight alignment which not only excels by a very compact construction requiring a minimum of seals but significantly lessens its proneness to failures.

Another object of the present invention relates in a pneumatically operating control installation for the automatic alignment of motor vehicle headlights which is characterized by high response sensitivity, simplicity in design and minimum of individual parts.

These and other objects, features, and advantages of the present invention will become more apparent from the following description when taken in connection with the accompanying drawing which shows, for purposes of illustration only, two embodiments in accordance with the present invention, and wherein:

FIG. 1 is an axial cross-sectional view through a control mechanism for the automatic alignment of motor vehicle headlights according to the present invention;

FIG. 2 is an axial cross-sectional view through a modified embodiment of a control mechanism according to the present invention;

FIG. 3 is a partial cross-sectional view, on an enlarged scale, through the shifting element as used in the control mechanisms according to FIGS. 1 and 2; and FIG. 4 is a schematic view of the control mechanism according to the present invention disposed in a control installation for controlling the automatic alignment of motor vehicle headlights.

Referring now to the drawing wherein like reference numerals are used throughout the various views to designate like parts, and more particularly to FIG. 1, the control mechanism according to this figure consists of an essentially cylindrical housing 1 made of suitable synthetic plastic material with covers 2 and 3 connected on both sides thereof and with a partition wall 4 subdividing the housing in a transverse direction. A control element generally designated by reference numeral 5, a control shifting device generally designated by reference numeral 6 and a working element generally designated by reference numeral 7 are arranged one behind the other within the housing 1. The control element 5 occupies the space between the partition wall 4 and the cover 2 and includes a diaphragm 8 clamped between the housing 1 and the cover 2 which subdivides the space into a chamber 9 and a chamber 10. The chamber 9 is in communication with a pressure modulator M of one axle A of the vehicle by way of a short connecting pipe stub 11 while the chamber 10 is in communication with a pressure modulator M¹ of the other axle A¹ of the vehicle by way of a short connecting pipe stub 12 as shown most clearly in FIG. 4.

The working element 7 consists of a diaphragm 13 arranged between the partition wall 4 and the cover 3 and clamped between the housing 1 and the cover 3 which subdivides the space into a chamber 14 and into a chamber 15. The chamber 15 is in communication with the atmosphere by way of one or several bores 16 in the cover 3.

The control shifting device 6 is constituted by a shifting pin 17 and by a valve generally designated by reference numeral 18. The shifting pin 17 is centrally connected with the diaphragm 8 and extends through a central bore 20 in the partition wall 4 provided with a seal 19 into the chamber 14 up to the valve 18.

As can be seen more clearly from FIG. 3, the valve 18 consists of a central bore 21 in the diaphragm 13, of an annular space 23 arranged underneath the diaphragm 13 in the central support part 22 for the diaphragm 13 which is in communication by way of a bore 24 with the chamber 15, and of a cylindrical space 25 provided in the support part 22 underneath the bore 21 whose diameter is larger than the diameter of the shifting pin 17.

A hollow piston rod 26 is fastened above the diaphragm 13 at the mounting and support part 22; the hollow piston rod 26 extends through the cover 3 while the hollow space 27 of the piston rod 26 is connected with a vacuum source V FIG. 4 by way of a short connecting pipe stub 28. A lever 30 is pivotally connected at the upper end of the piston rod 26 by means of a ball joint 29. As shown in FIG. 4, the respective headlights L of the vehicle are aligned by means of the lever 30.

The central area of the diaphragm 13 is pressed against the support part 22 by a spring 31. An air filter 32 is arranged in front of the bore 16 within the cover 3. Furthermore, springs 33, 34 and 35 which are supported at the respective diaphragms are provided in the chambers 9, 10 and 14, respectively. The cover 2 is provided with a ball socket 36 in which is seated a ball head 38 for the mounting of the control mechanism at a fixed vehicle part 37.

The connection of the shifting pin 17 with the diaphragm 8 may possibly be so constructed with the use of a universal joint entrainment means that misalignments and ensuing jamming of the shifting pin in the bore 20 are avoided.

The diaphragm 8 is constructed double-walled between the radially outer clamping place and the radially inner clamping place thereof whereby the two walls are clamped radially outwardly thereof at a distance from one another. The space between the two walls is in communication with the atmosphere by way of a bore 39.

A differential pressure between the two chambers 9 and 10 of the control element 5 effects by way of the diaphragm 8 a movement of the shifting pin 17 against the return effect of the springs 33, 34 in a direction corresponding to the inclined position of the vehicle.

If a greater vacuum prevails in the chamber 9 than in the chamber 10, then the shifting pin 17 lifts off from the bore 21 at the valve 18 and carries out a corresponding travel or displacement proportionally to the differential pressure. As a result thereof, vacuum reaches from the hollow space 27 through the bore 21 and the space 25 the chamber 14 so that the diaphragm 13 carries out a stroke against the spring 35 until the shifting pin 17 again seals off the bore 21.

If a larger vacuum exists in the chamber 10 than in the chamber 9, then the shifting pin 17 lifts off the diaphragm 13 centrally from the support member 22 so that atmospheric air flows into the chamber 14 out of the chamber 15 by way of the bore 24 and the annular space 23. The spring 35 presses the diaphragm 13 by way of the support member 22 so far in the upward direction until the diaphragm 3 again seals off the annular space 23. By reason of the displacement dependent control, frictional contacts in the adjusting linkages for the headlights have no influence on the accuracy of the control system.

FIG. 2 illustrates that also the piston rod 26 which in FIG. 1 consists of sheet metal may be constructed of suitable synthetic plastic material. A ball joint 40 may also be arranged in the piston rod 26.

While we have shown in described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A pneumatically operating control installation for the automatic alignment of motor vehicle headlights which includes pressure modulator means coordinated to the two axles of the motor vehicle which align the motor vehicle headlights to a constant light distance in dependence on the change of the distance of the respective axle to the body of the motor vehicle by way of a control element, a control shifting device and a working element, and in which the control installation is fed with a vacuum, characterized in that the control element, the control shifting device and the working element are arranged one behind the other in a structural unit consisting of a single housing means closed off on both sides by cover means.

2. A pneumatically operating control installation for the automatic alignment of motor vehicle headlights which includes pressure modulator means coordinated to the two axles of the motor vehicle which align the motor vehicle headlights to a constant light distance in dependence on the change of the distance of the respective axle to the body of the motor vehicle by way of a control element, a control shifting device and a working element, and in which the control installation is fed with a vacuum, characterized in that the control element, the control shifting device and the working element are arranged one behind the other in a structural unit consisting of a single housing means closed off on both sides by cover means, and in that the housing means is subdivided by a partition wall into two spaces, of which one space for purposes of forming the control element, is subdivided by a first diaphragm means into two chambers connected with a respective pressure modulator means, and in which the other space, for the purposes of forming the working element is also subdivided into two further chamber means by a further diaphragm means which carries out the alignment of the headlights by way of a piston rod means, one of the two further chamber means being in communication with the atmosphere and the other being adapted to be connected by way of the control shifting device either with a vacuum source or with the atmosphere.

3. A control installation according to claim 2, characterized in that the control shifting device includes a shifting pin means operatively connected with the diaphragm means of the control element and extending through the partition wall, and a valve means controlled by the shifting pin means and including the further diaphragm means of the working element.

4. A control installation according to claim 3, characterized in that the valve means includes two valve seats adapted to be alternately opened or closed in dependence on the position of the shifting pin means, one of said valve seats in the open position of the valve means operatively connecting the further chamber means connected with the atmosphere with the other further chamber means, and the other valve seat connecting said other further chamber means with a hollow space in the piston rod means which is in communication with the vacuum source.

5. A control installation according to claim 4, characterized in that the diaphragm means separating the chamber means of the control element is contructed double-walled between the clamping places radially inwardly and radially outwardly thereof and the space between the walls of the doublewalled construction is connected with the atmosphere.

6. A control installation according to claim 5, characterized in that the cover means of the housing means closing off the control element forms in its central area a ball socket.

7. A control installation according to claim 6, characterized in that the piston rod means is provided with a ball socket.

8. An installation according to claim 7, characterized in that the housing means, its two cover means and the piston rod means together with its ball socket consist of synthetic plastic material.

9. A control installation according to claim 2, characterized in that the diaphragm means separating the chamber means of the control element is constructed double-walled between the clamping places radially inwardly and radially outwardly thereof and the space between the walls of the double-walled construction is connected with the atmosphere.

10. A control installation according to claim 2, characterized in that the piston rod means is provided with a ball socket.

11. An installation according to claim 2, characterized in that the housing means, its two cover means and the piston rod means together with its ball socket consist of synthetic plastic material.

12. A pneumatically operating control installation for the automatic alignment of motor vehicle headlights which includes pressure modulator means coordinated to the two axles of the motor vehicle which align the motor vehicle headlights to a constant light distance in dependence on the change of the distance of the respective axle to the body of the motor vehicle by way of a control element, a control shifting device and a working element, and in which the control installation is fed with a vacuum, characterized in that the control element, the control shifting device and the working element are arranged one behing the other in a structural unit consisting of a single housing means closed off on both sides by cover means, and in that the cover means of the housing means closing off the control element forms in its central area a ball socket.

* * * * *